US007987243B2

(12) United States Patent
Stavrakos et al.

(10) Patent No.: US 7,987,243 B2
(45) Date of Patent: Jul. 26, 2011

(54) METHOD FOR MEDIA DISCOVERY

(75) Inventors: Nicholas J. Stavrakos, Los Altos, CA (US); Miguel Melnyk, Champaign, IL (US); John Rochon, New York, NY (US); Dimitris Hanos, Patras (GR); Spyros Kapotas, Patras (GR)

(73) Assignee: Bytemobile, Inc., Santa Clara, CA (US)

( * ) Notice: Subject to any disclaimer, the term of this patent is extended or adjusted under 35 U.S.C. 154(b) by 221 days.

(21) Appl. No.: 12/170,719

(22) Filed: Jul. 10, 2008

(65) Prior Publication Data
US 2009/0019151 A1 Jan. 15, 2009

Related U.S. Application Data

(60) Provisional application No. 60/948,907, filed on Jul. 10, 2007.

(51) Int. Cl.
*G06F 15/16* (2006.01)
(52) U.S. Cl. ........................................ 709/218; 715/716
(58) Field of Classification Search .................. 709/202, 709/203, 216, 218; 715/716, 779
See application file for complete search history.

(56) References Cited

U.S. PATENT DOCUMENTS
2005/0165789 A1 * 7/2005 Minton et al. .................. 707/10
2007/0044086 A1 * 2/2007 Sampath ........................ 717/168

OTHER PUBLICATIONS
International Search Report and Written Opinion of the International Searching Authority for International Application No. PCT/US2008/008509, mailed Jan. 21, 2009, 14 pages.
Ma, W., et al., "A framework for adaptive content delivery in heterogeneous network environments," proceedings of the IS&T/SPIE Conference on Multimedia Computing and Networking 2000, vol. 3969, pp. 86-100 (Jan. 24, 2000, San Jose, California).
Raggett, D., et al., "HTML 4.01 Specification," W3C Recommendation, pp. 1-389 (Dec. 24, 1999), retrieved from http://www.w3.org/TR/1999/REC-html401-19991224.
Barrett, R., et al., "Intermediaries" An approach to manipulating information streams, IBM Systems Journal, vol. 38, No. 4, pp. 629-641 (Nov. 4, 1999, San Jose, California).

* cited by examiner

*Primary Examiner* — Ajay Bhatia
*Assistant Examiner* — Peter Shaw
(74) *Attorney, Agent, or Firm* — Finnegan, Henderson, Farabow, Garrett & Dunner LLP

(57) ABSTRACT

A method including receiving a request for a web page; communicating with a content server by receiving content associated with the requested web page; determining whether the content includes particular content requiring plug-in support; initiating a native plug-in to handle the particular content; receiving a request for additional content from the native plug-in; retrieving the additional content for the native plug-in; monitoring the additional content to determine whether the additional content includes media content; and updating the content for the requested web page based on the monitoring.

15 Claims, 8 Drawing Sheets

METHOD FOR MEDIA DISCOVERY

CROSS REFERENCE TO RELATED PATENTS

This application claims the benefit of U.S. Provisional Application No. 60/948,907, filed Jul. 10, 2007, "Method for Media Discovery," which is herein incorporated by reference.

BACKGROUND INVENTION

Many different devices contain Internet web browsers capable of displaying web pages, for example, desktop/laptop computers, gaming consoles, and phones. While many of these devices contain browsers, the capabilities of these browsers are vastly different. For example, PC web browsers are generally much more powerful than phone browsers. While PC browsers support a wide range of media/content types (e.g. HTML, GIF, JPEG, JavaScript, CSS, etc.), handset browsers may only support a simpler and smaller subset of content types (e.g. xHTML-MP, PNG, GIF, CSS-MP). Also, most web pages on the Internet today are designed and developed for PC browsers with only a relatively few web pages developed for the phone browsers.

Further, PC browsers can be extended to support additional content types via extensions called plug-ins. First developed by the Netscape browser, and now supported by most PC browsers (e.g. Microsoft Internet Explorer, Opera, Firefox, etc.), the Netscape Plug-in API allows third party software developers to extend the content type support of a browser by writing software modules that are invoked by the browser when it encounters a content type that the plug-in has registered with the browser to handle. This level of extensibility is rare with phone browsers, and may only appear in high-end handsets. Mass market phone browsers do not have a method that extends their functionality so web pages with content types that the phone browser can not handle will not be displayed properly. Such popular plug-ins that may be affected include Adobe Flash Plug-in, Windows Media Plug-in, Quicktime Plug-in, Real Media Plug-in, among others.

In recent years, multimedia content has exploded onto the Internet scene with many web pages providing video content. There are many different methods to deliver video to web browsers. The different methods can be categorized broadly into one of two categories. The first is media that plays external to the web browser. In this category, an external application (typically a media player) will be launched by the browser and will play the media content. The other category, popularized by web sites such as, YouTube, MySpace, Google Video, Yahoo Video, do not require a external application, but rather deliver the video within the web page via a plug-in. Further, these sites allow other web sites (e.g., blogs) to embed the same video within their web pages via the use of a plug-in. The video is delivered from the popular site (e.g. YouTube) to the web browser, but is displayed within another third party web site. This ability to link videos from video sharing sites to any other site has only further spurred the use of video in web sites.

As mentioned above, because phone web browsers typically do not support a Plug-in API, such as Netscape Plug-in API, they can not play videos from these popular sites or sites that embed the videos into their sites. For web browsers not supporting the necessary plug-ins, two prior techniques that make these types of videos available to users include (1) the Manual Identification/Hard Coding method and (2) the Phone Web Browser Friendly Site method.

In the Manual Identification/Hard Coding method, a web site is manually analyzed and the method to extract the video from that particular web site is determined. An intermediary node modifies the access to the video web site and converts the plug-in in the web page to a link to the video. This conversion is hard coded for each and every web site. If the web browser on the phone is pointed to a web site (i.e., YouTube) that does not have this hard coding, then the intermediary node will not be able to identify the video and the handset will not be able to play the video. Furthermore, if an already hard coded site changes the method it uses to retrieve the video for itself, then the previously hard coded method may no longer work.

In the Phone Web Browser Friendly Site method, the same investigation for each site is performed to identify how the site delivers video content. But now this information is used to create a web site that can be accessed by a phone web browser and from which a phone web browser can play the videos. There are currently two types of Phone Web Browser Friendly sites: (1) a website, e.g., m.youtube.com mobile website, conducting a "Phone Web Browser Friendly" analysis themselves and presenting a webpage for phones and (2) an "aggregator" site that conducts "Phone Web Browser Friendly" for several different websites and proves a phone friendly interface to a website that otherwise would not be phone accessible. This method has the same limitations as described in the previous method.

In contrast, the embodiments of the system and method of this patent application can automatically discover media content on a web page without requiring prior analysis of the web site and without having any sort of hard coding performed to access the media This new method and system for identifying media content will greatly increase the number of video sites that can be accessed by phone web browsers without the manual and time consuming step of analyzing individual web sites.

DETAILED DESCRIPTION OF DRAWINGS

Reference will now be made in detail to the exemplary embodiments implemented according to the invention, the examples of which are illustrated in the accompanying drawings. Wherever possible, the same reference numbers will be used throughout the drawings to refer to the same or like parts.

The following embodiments describe a method and system for media discovery that identifies and makes accessible media content to phones that would otherwise not be assessable content due to limitations of the phone. Once the one or more media files are discovered, the web page content can be modified either directly or indirectly. The content can be modified directly by inserting an image and/or a link into the markup language of the web page so that the phone web browser user can click on the image or link to play the media content. The content can be modified indirectly by inserting a script (e.g. JavaScript) that the phone web browser can execute thereby updating the web page on the phone web browser with the appropriate link that the user can click to play the media content.

The embodiments of the method and system can utilize pre-existing third party plug-ins that support specific media types, instead of implementing alternative plug-ins to these media types or inspecting/parsing the content of the media types. Rather, the embodiments monitor the interaction between the native plug-ins and the media servers that they access. This monitoring can be done at several different locations; several of these types of interactions provided by the locations are described below.

Figure 1:
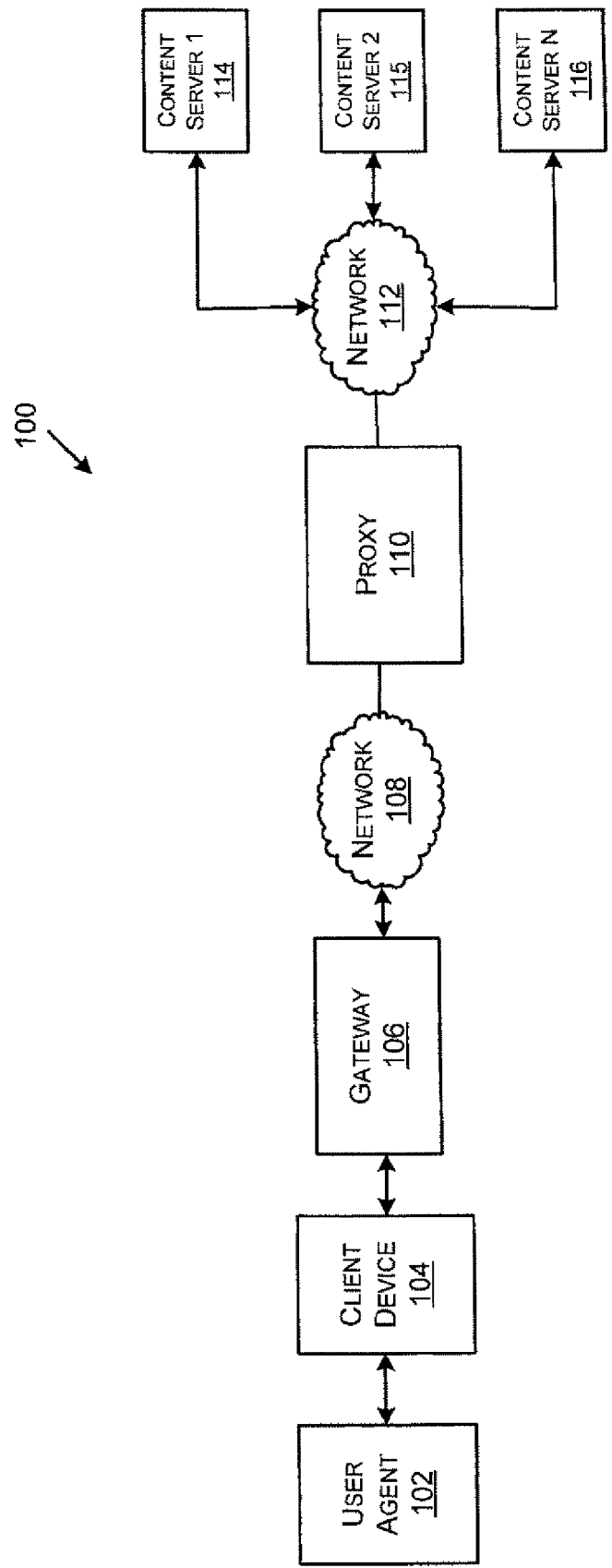
FIG. 1 is a block diagram of an exemplary system.

FIG. 1 is a block diagram of an exemplary system 100. Exemplary system 100 can be any type of system that transmits data over a network, such as a wireless network, Internet, etc. For example, the exemplary system can include a browser requesting access to content from content servers through the Internet. Exemplary system can include, among other things, a user agent 102, a client device 104, a gateway 106, one or more networks 108, 112, an optimization server 110, and one or more content servers 114-116.

User agent 102 is a client application used with a network protocol. For example, user agent 102 could be a web browser, a search engine crawler, a screen reader, or a Braille browser, and user agent 102 could be used to access the Internet. User agent 102 can be a software program that transmits request data (e.g., an HTTP/HTTPS/WAP/WAIS/Gopher/RTSP request, etc.) to a web server and receives response data in response to the request data. For example, user agent 102 can send request data to content servers 114-116 for a particular media file or of a web page by its URL, and the content server of the web page can query the object data in a database and can send back the object data as part of the response data (e.g., HTTP/WAP response data) to user agent 102. This process continues until every object in the web page has been downloaded to the user agent.

Client device 104 is a computer program or hardware device that can access remote services. Client device 104 can receive request data from user agent 102, can transmit the request data to the content servers, and can receive response data in response to the request data. For example, client device 104 can be Bytemobile Optimization Client Software. In some embodiments, user agent 102 and client device 104 can be housed in the same device, such as a computer, a PDA, a cell phone, a laptop, or any device accessing the Internet. In some embodiments, client device 104 can be removed and its functionality can be included in user agent 102.

Gateway 106 is a device that converts formatted data provided in one type of network to a particular format required for another type of network. Gateway 106, for example, may be a server, a router, a firewall server, a host, or a proxy server. The gateway 106 has the ability to transform the signals received from client device 104 into signals that network 108 can understand and vice versa. Gateway 106 may be capable of processing audio, video, and T.120 transmissions alone or in any combination, and is capable of full duplex media translations.

Networks 108 and 112 can include any combination of wide area networks (WANs), local area networks (LANs), or wireless networks suitable for networking communication such as Internet communication.

Proxy 110 is a server that provides communication between gateway 106 and content servers 114-116. For example, proxy 110 could be a Bytemobile Optimization Services Node. Proxy 110 can optimize performance by enabling significantly faster and more reliable services to customers.

Content servers 114-116 are servers that receive the request data from user agent 102, process the request data accordingly, and return the response data back to user agent 102. For example, content servers 114-116 can be a web server, an enterprise server, or any other type of server that provides content, such as web page content and/or media data. Content servers 114-116 can be a computer or a computer program responsible for accepting HTTP requests from the user agent and serving the user agents with web pages.

Figure 2:
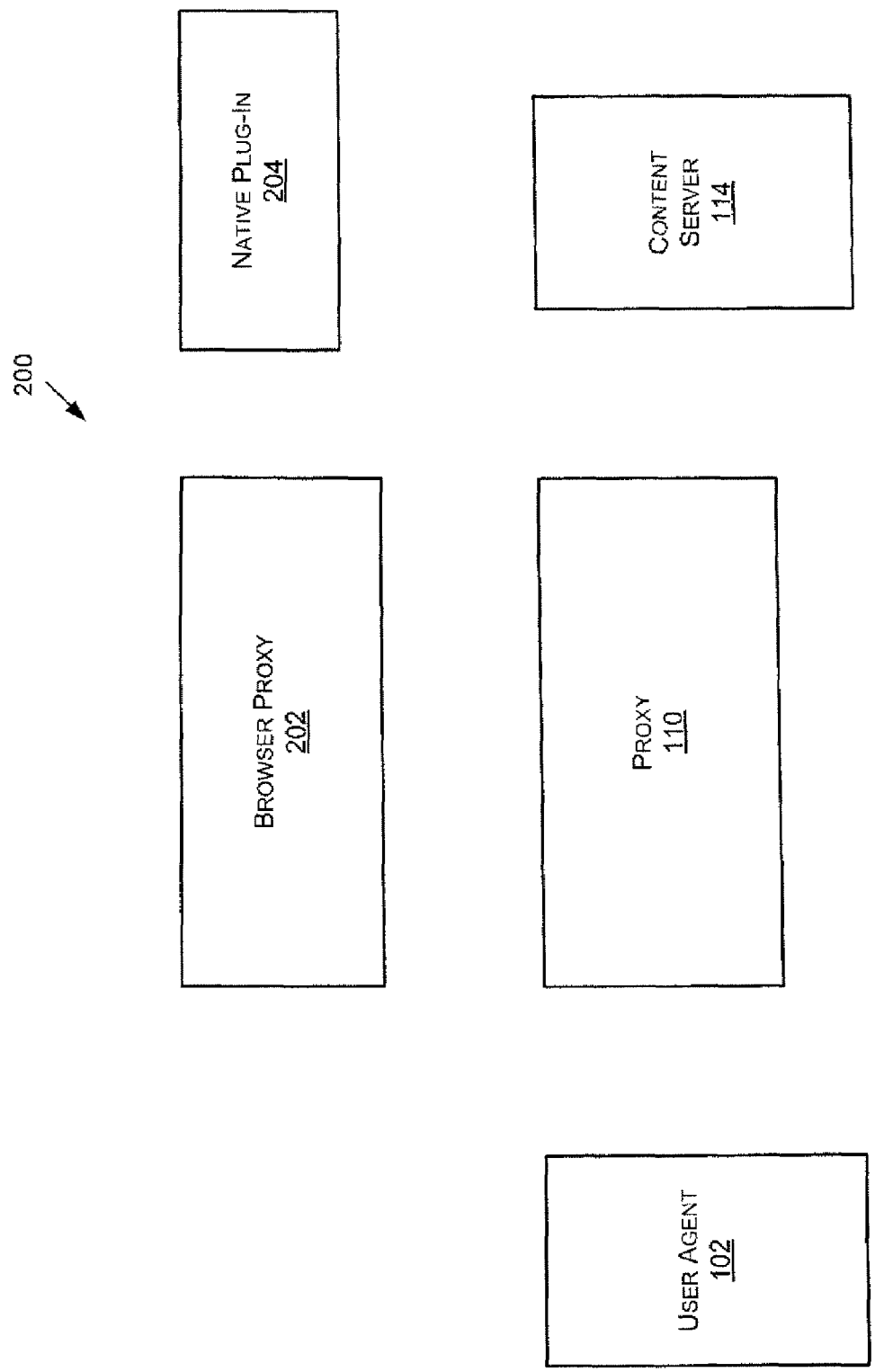
FIG. 2 illustrates a block diagram of an exemplary system implementing proxy-assisted media discovery.

FIG. 2 illustrates a block diagram of an exemplary system 200 implementing a proxy-assisted media discovery or a browser based media discovery. Exemplary system 200 can include, among other things, user agent 102, proxy 110, a browser proxy 202, a native plug-in 204, and content server 114, which exemplifies one or more content servers.

Browser proxy 202 is a hardware component and/or software module receiving intercepted requests from proxy 110 and processes these requests accordingly. Browser proxy 202 can communicate directly with content server 114 or can communicate indirectly to content server 114 through proxy 110. Further, browser proxy 202 can render a webpage based on the intercepted request. For example, this rendering may include executing associated JavaScript and plug-in extension to the browser. Based on the rendering, browser proxy 202 may create a plug-in, such as native plug-in 204, so that the webpage can be displayed properly. After creating plug-in, browser proxy 202 can monitor URL requests by native plug-in 204 to content server 114 for media content. In some embodiments, browser proxy 202 can provide content adaptation, such as the content adaptation described in U.S. application Ser. No. 11/636,033, titled "Content Adaptation," which is herein incorporated by reference. In some embodiments, if user agent 102 is a phone web browser, browser proxy 202 has the capability of reformatting a web page to fit within the small screen of the phone. While browser proxy 202 is illustrated as a separate item from proxy 110, one of ordinary skill in the art will appreciate that browser proxy 202 and proxy 110 could be a single item.

Native plug-in 204 is a third party provided plug-in that typically registers with a browser to handle specific content types. For example, web browsers often use plug-ins to play media files. Native plug-in 204 can be created by browser proxy 202 based on whether the requested content, e.g., webpage, requires special plug-in support. In some embodiments where the requested content includes media data, native plug-in 204 can be created to receive the media data for executing.

Figure 3:
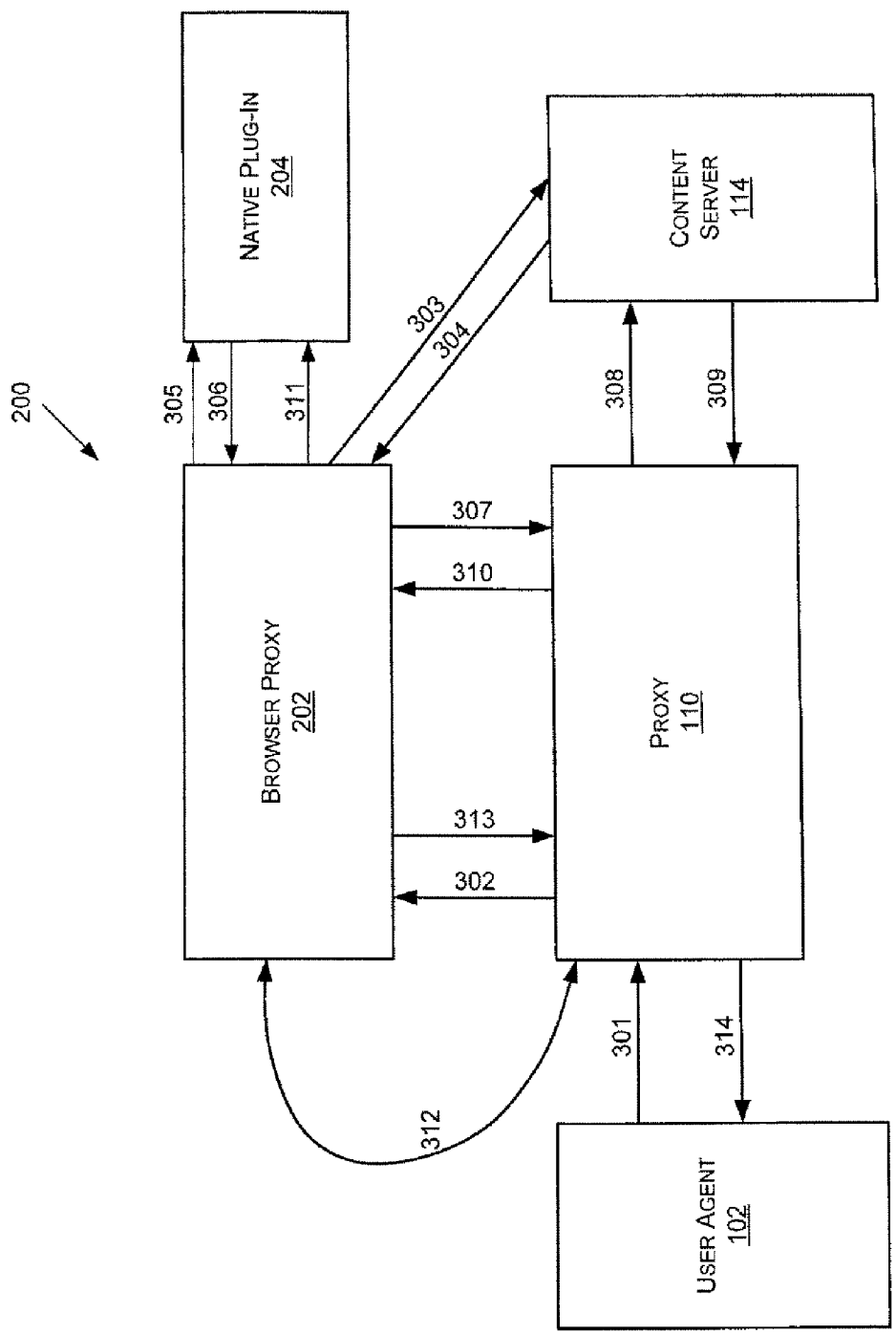
FIG. 3 is a functional diagram illustrating an exemplary communication flow in the exemplary system of FIG. 2.

FIG. 3 is a functional diagram illustrating an exemplary communication flow in the exemplary system of FIG. 2. In the proxy-assisted media discovery embodiment, user agent 102 transmits (301) an HTTP request for web content, from content server 114, where proxy 110 intercepts the request. Upon intercepting this request, proxy 110 forwards (302) the request to browser proxy 202. Browser proxy 202 can then request (303) the download of the requested web content from content server 114 directly as illustrated or indirectly, e.g., through proxy 110. Content server 114 can provide (304) all requested web content to browser proxy 202, which attempts to render the content.

During the rendering of this web page, if the web content contains any content that require special plug-in support (e.g. Adobe Flash Plug-in), browser proxy 202 creates (305) native plug-in 204, which is registered to handle the particular content needing the support, by providing the particular content to native plug-in 204. While executing, if additional content is detected and needs to be downloaded, native plug-in 204 can request (306) browser proxy 202 to download the additional content. In some embodiments, native plug-in 204 can communicate this request to and receive content directly from content server 114. Browser proxy 202 can store a URL associated with the additional content. To download the additional content, browser proxy 202 provides (307) a URL of the additional content to Proxy 110. Proxy 110 then forwards (308) the URL of the additional content to content server 114, which responds (309) with the corresponding content to proxy 110.

Proxy 110 can passively monitor or inspect this additional content to determine whether the additional content includes a media file to be downloaded by Native plug-in 204. If the response data is not a media file, proxy 110 can forward (310) the response data to the browser proxy 202, which in turns forwards (311) the response content to native plug-in 204 for further processing.

On the other hand, if the response data is a media file, then proxy 110 forwards (310) the data to browser proxy 202. At this point, browser proxy 202 can transmit (311) either the response data or a short media file to native plug-in 204. In some embodiments, if a short media file is sent to native plug-in, browser proxy 202 discards the response data from the requested URL. In response to the transmittal at step 311, if the native plug-in 204 makes another response, then a similar process starting at URL request step 306 can be repeated.

The option to discard the response data and send a short media clip by browser proxy 202 can be determined based on whether a single media file is to be played or if a series of media files (playlist) is to be played. For example, a short video clip could be sent to help find the playlist. Playlists for Adobe Flash plug-ins are embedded in the content of the plug-in code, so native plug-in 204 would likely request multiple video files and create a playlist. To get through this playlist quickly, even though a video is requested by the plug-in, a short video clip can be sent to trick the plug-in so it can request the second, third, etc. video clips quickly.

In response to finding a single media file, proxy 110 can send (312) a message to browser proxy 202 informing it that the response data it has just forwarded is a media file. Browser proxy 202 can use the information from the received message and update the web page appropriately (e.g., by inserting an image and a link into the web page to allow the user to click on the link and play the media). Further, browser proxy 202 can associate the URL with the media file. When the processing of the web page is complete, browser proxy 202 can send (313) the resulting data for the web page to proxy 110, which can forward (314) this data to user agent 102 for the page to be displayed.

On the other hand, for the scenario where a series of media files are to be played, if native plug-in 204 requests one or more additional media files, browser proxy 202 can remember the URL along with the previous URLs and generate a playlist. If no further request is issued by native plug-in 204, then browser proxy 202 can stop native plug-in 204, and browser proxy 202 sends (313) the resulting web page back to proxy 110, which forwards (314) the response to user agent 102.

As indicated above, in some embodiments, proxy 110 and browser proxy 202 can be accumulated into a single proxy. One of ordinary skill in the art will appreciate that exemplary communication flow of FIG. 3 can be modified to accommodate a single intermediate proxy having features of both proxy 110 and browser proxy 202.

Figure 4:
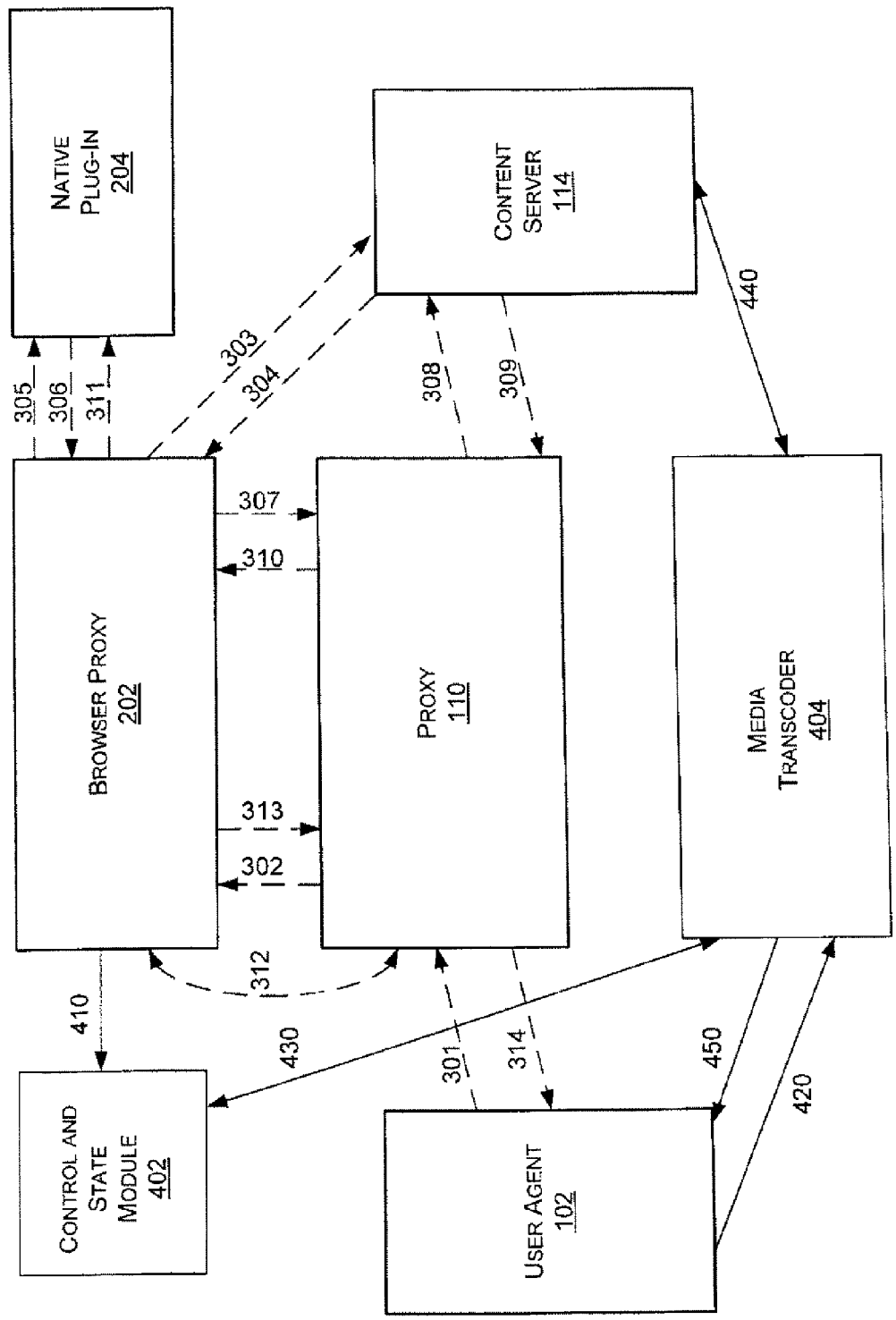
FIG. 4 is a functional diagram illustrating a further exemplary communication flow in the exemplary system of FIG. 3.

FIG. 4 is a functional diagram illustrating a further exemplary communication flow in exemplary system 200 of FIG. 3. FIG. 4 further illustrates how exemplary system 200 works with other components of a network to provide media data to user agent 101. For example, as illustrated above at step 312, browser proxy 202 may receive a notification from proxy 110 that certain content relates to media files. Browser proxy 202 can update the webpage by inserting an image and/or a link (collectively known as inserted data) along with an assigned token for identifying the inserted data into web page. After the token is assigned, browser proxy 202 can transmit (410) the token and the location of the media file data, such as a URL of the media file data, to a control and state module 402, which stores this information for later retrieval.

Once the user agent 102 receives the webpage at step 314, a user at user agent 102 can select the inserted data to see the media file. The user agent 102 can transmit (420) a message having the token to a media transcoder 404. For example, the token could be transmitted via the link inserted by the plug-in and clicked on by the user. In some embodiments, media transcoder 404 could be an adaptive bitrate manager as provided in U.S. application Ser. No. 12/170,347, titled "Adaptive Bitrate Management for Streaming Media over Packet Networks," which is herein incorporated by reference. Media transcoder 404 can communicate (430) with control and state module 402 by providing the token in exchange for the stored media file location data. Upon receiving the media file location data, media transcoder 404 communicates (440) with content server 114 to obtain the media file. After obtaining the media file, media transcoder 404 can process the media file accordingly and transmit (450) the media files to user agent 102.

Figure 5:
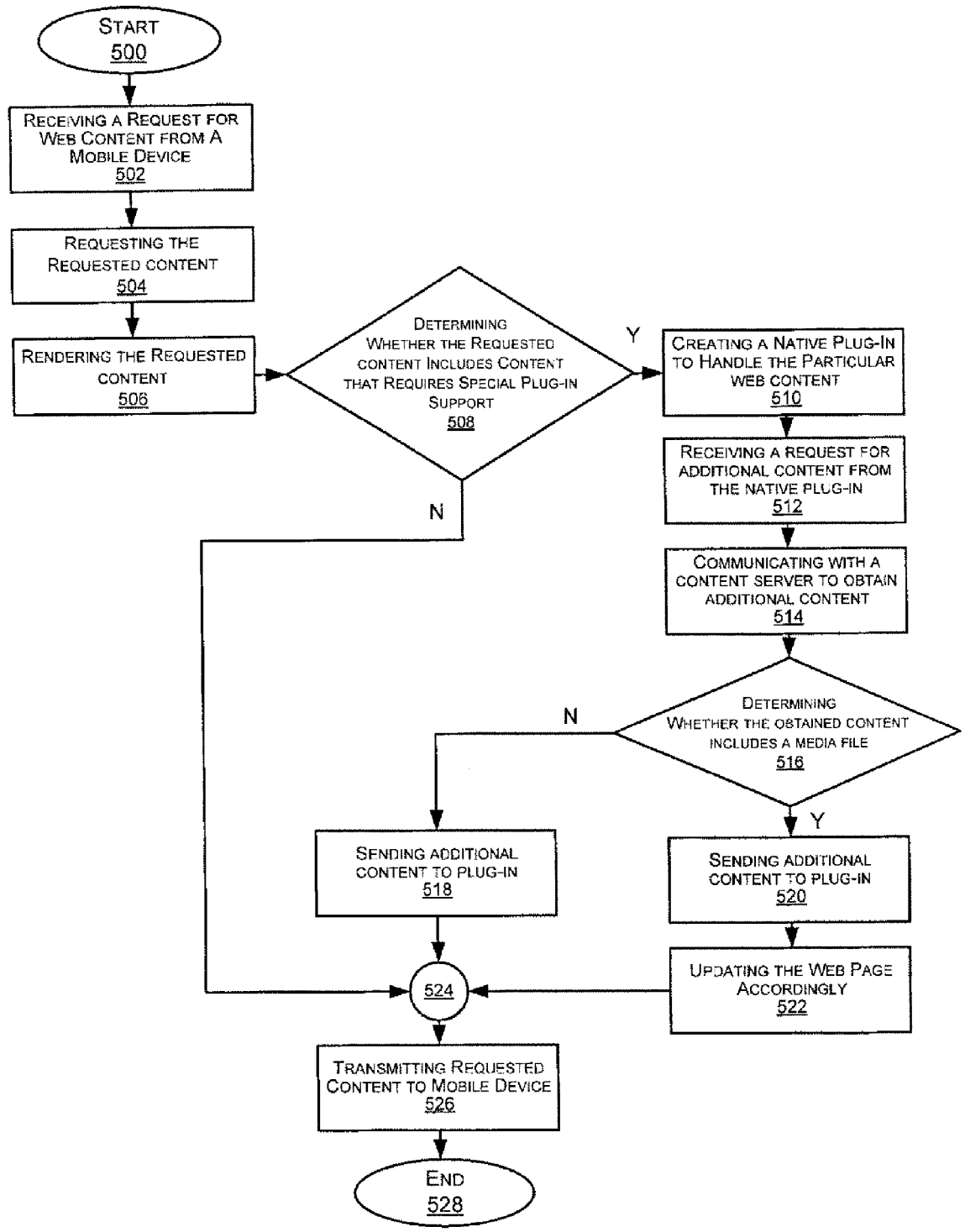
FIG. 5 is a flowchart representing an exemplary method for implementing media discovery.

FIG. 5 is a flowchart representing an exemplary method for implementing media discovery. Referring to FIG. 5 it will be readily appreciated by one of ordinary skill in the art that the illustrated procedure can be altered to delete steps or further include additional steps. After initial start step 500, a proxy server (e.g., proxy 110 and/or browser proxy 202) receives (502) a request for content (e.g., webpage) from a mobile device. In some embodiments, the proxy server may actually intercept a communication between the mobile device and a content server having the content of the request. After receiving the request, the proxy server requests (504) the requested content from the content server. Upon receiving the requested content, the proxy server renders (506) the content.

Upon rendering the content, the proxy server can determine (508) whether the requested content includes content that requires special plug-in support. If not, the method proceeds to connector 524. On the other hand, if the requested content does include content requiring special plug-in support, the proxy server can create (510) a native plug-in to handle the content.

At some point thereafter, the proxy server may receive (512) a request for additional content from the native plug-in. The proxy server then communicates (514) with a content server to obtain the additional content. After receiving the additional content, the proxy server determines (516) the obtained additional content includes one or more media files. If not, the proxy server sends (518) the requested additional content to native plug-in and the method can proceed to connector 524. If the requested media content does include one or more media files, the proxy server sends (520) the additional content to native plug-in and updates (522) the web content, e.g., by including a picture and/or a link in the place of the media files. The picture/link would allow a user at a user agent of the mobile device the ability to click on the picture/link for accessing the media files. Further, because the media files are not initially included with the requested content to be transmitted to the user agent, the time for downloading the content can be significantly reduced.

After updating the content, the method proceeds through connector 524 and the proxy server transmits (526) the web content to the mobile device. After the transmittal, the method can end 524.

Figure 6:
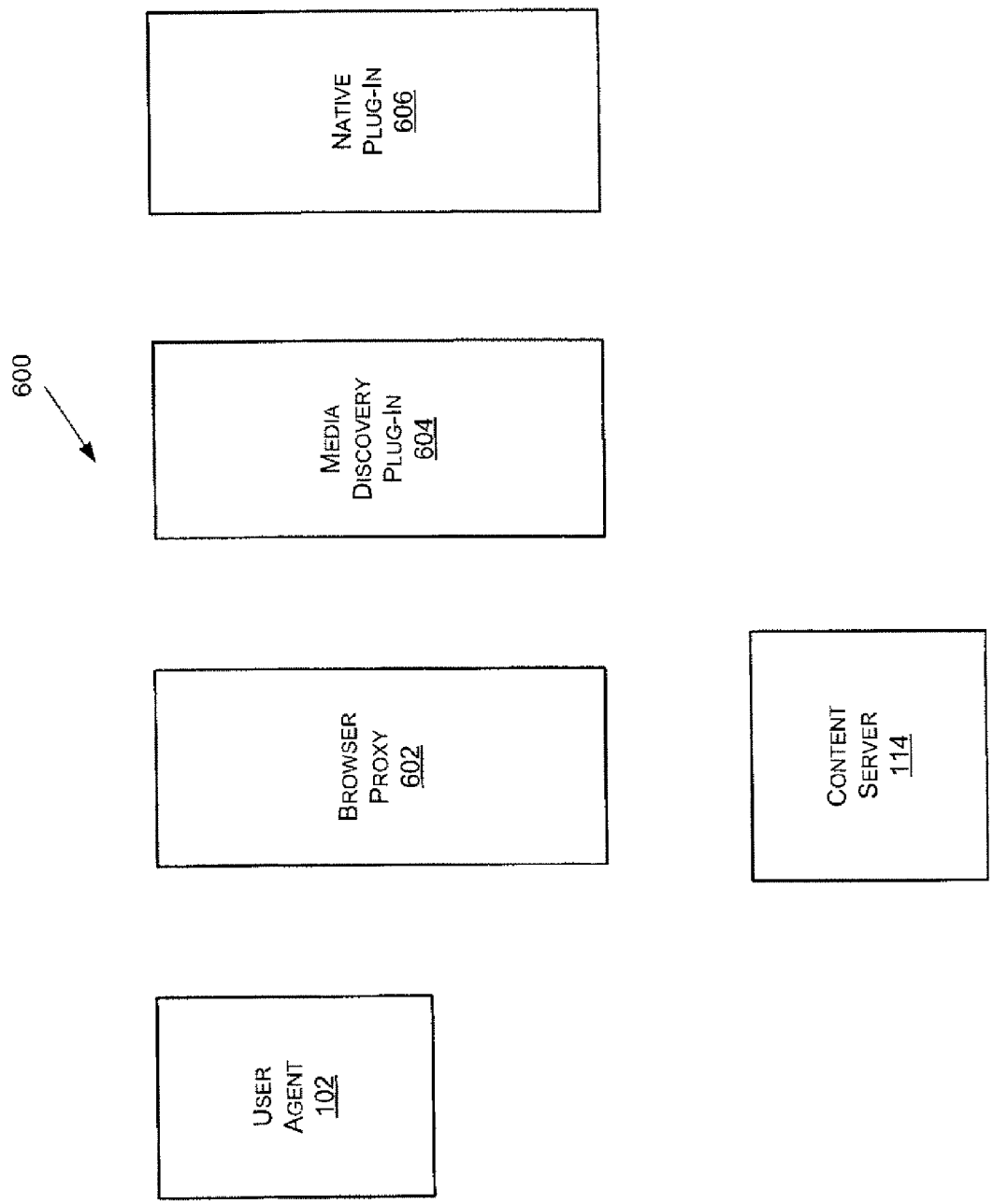
FIG. 6 illustrates a block diagram of an exemplary system implementing plug-in-based media discovery.

FIG. 6 illustrates a block diagram of an exemplary system 600 implementing plug-in-based media discovery. Exemplary system 600 can include, among other things, user agent 102, a browser proxy 602, a media discovery plug-in 604, a native plug-in 606, and content server 114, which exemplifies one or more content servers.

Browser proxy 602 is a hardware component and/or software module receiving requests from user agent 102 and processes these requests accordingly. Browser proxy 602 is an intermediary proxy, which can include only a browser proxy or both a proxy and a browser proxy (e.g., proxy 110 and browser proxy 202). Browser proxy can communicate directly with content server 114. Further, browser proxy 602 can render a webpage when receiving requested content. For example, this rendering may include executing associated JavaScript and plug-in extension to the browser. Based on the rendering, browser proxy 602 may create a plug-in, such as media-discovery plug-in 604 and/or native plug-in 606, so that the webpage can be displayed properly. In some embodiments, browser proxy 602 can provide content adaptation, such as the content adaptation described in U.S. application Ser. No. 11/636,033, titled "Content Adaptation," which is herein incorporated by reference. In some embodiments, if user agent 102 is a phone web browser, browser proxy 602 has the capability of reformatting a web page to fit within the small screen of the phone.

Media discovery plug-in 604 can be a standard browser plug-in (erg., implemented using the Netscape Plug-in API) that registers with a browser to handle a set of specific content types (e.g., Shockwave Flash content). Specifically, it registers with browser proxy 602 to handle the content types that native plug-in 606 can handle. After native plug-ins 606 is initiated, media discovery plug-in 604 can monitor URL requests by native plug-in 606 to content server 114 for media content. For example, media discovery plug-in 604 could expose a web browser API to the native plug-in 606 as if the media discovery plug-in 604 were a web browser.

In some embodiments, media discovery plug-in 604 does not need to initiate native plug-in 606. In these embodiments, media discovery plug-in 604 receives the particular content, examines the content, and requests additional content from content server 114 if needed. If it receives additional content, media discovery plug-in 604 can examine the content to determine if media content is included.

Native plug-in 606 is a third party provided plug-in that typically registers with a browser to handle specific content types. For example, web browsers often use plug-ins to play media files. Native plug-in 606 can be created by media discovery plug-in 604 or browser proxy 602 based on whether the requested content, e.g., webpage, requires special plug-in support. In some embodiments where the requested content includes media data, native plug-in 606 can be created to receive the media data for executing. Because native plug-in 606 believes that media discovery plug-in 604 is the web browser, native plug-in 606 can interact with media discovery plug-in 604 as if it were a web browser.

Figure 7:
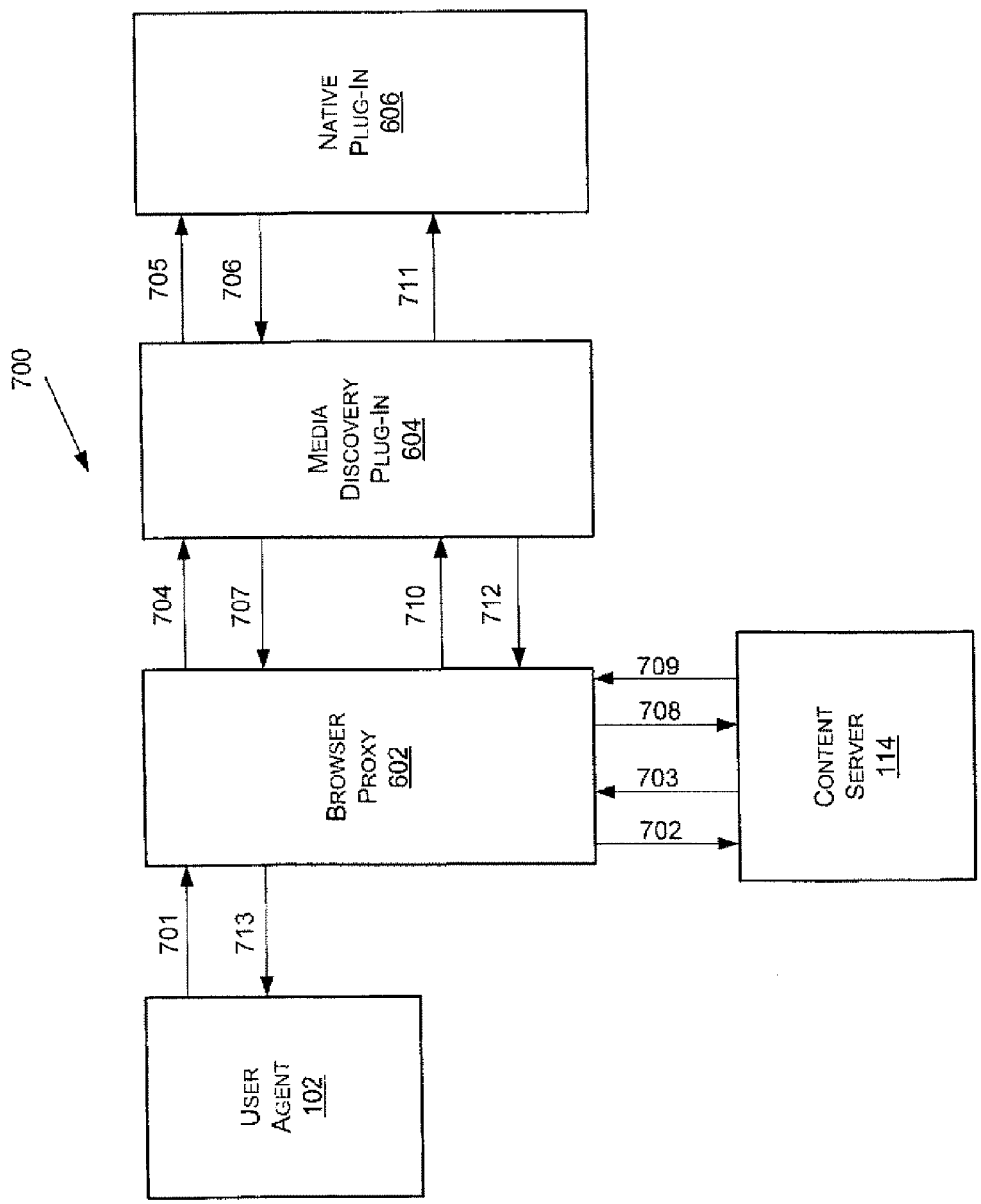
FIG. 7 is a functional diagram illustrating an exemplary communication flow in the exemplary system of FIG. 6.

FIG. 7 is a functional diagram illustrating an exemplary communication flow in exemplary system 600 of FIG. 6. In the plug-in based media discovery embodiment, user agent 102 transmits (701) a request, such as an HTTP request or a WAP request, for web content. In some embodiments, browser proxy 602 intercepts the request while in other embodiments, user agent 102 sends the request directly to browser proxy 602. Upon receiving the request, browser proxy 602 requests (702) the download of all requested content from content server 114. Content server 114 provides (703) the requested content to browser proxy 602, which then processes this data. Further, one of ordinary skill in the art will appreciate that the embodiments provided in FIGS. 6-7 can be incorporated into the exemplary system provided in FIG. 4.

During the processing of this content, if the content contains any content that require special plug-in support (e.g. Adobe Flash Plug-in), browser proxy 602 creates (704) an instance of media discovery plug-in 604 by sending the particular content data to media discovery plug-in 604. Upon receiving the particular content, media discovery plug-in 604 inspects the data and creates (705) an instance of native plug-in 606 by passing the particular content data to native plug-in 606. In some embodiments, the creation of the native plug-in 606 is not needed and the media discovery plug-in 604 is used to implement the media discovery. Native plug-in 606 can inspect this data and perform the exact same or similar functionality as it would if it were executed by a web browser.

While executing, if additional content is detected and needs to be downloaded, native plug-in 606 requests (706) media discovery plug-in 604 to download a URL referencing the additional content. Media discovery plug-in 604 records this URL request and forwards (707) the request to browser proxy 602.

After receiving the request, browser proxy 602 can issue (708) a request to content server 114 to retrieve the additional content. Content server 114 then responds (709) with the requested additional content. Because the HTTP request was made by a plug-in, browser proxy 602 can simply forward (710) the additional content to media discovery plug-in 604, which can passively monitor or inspect the additional content. If the additional content includes media content, media discovery plug-in 604 can record that the URL that requested this data corresponds to a media file. At this point, media discovery plug-in 604 can transmit (711) either the additional content or a short media file to native plug-in 606. In some embodiments, if a short media file is sent to native plug-in 606, media discovery plug-in 604 can discard the additional content from the requested URL. Further, in response to receiving the response data at step 711, if the native plug-in 606 makes another response, then the exact same process starting at URL request step 706 is repeated.

The option to discard the additional content and send a short media clip by media discovery plug-in 604 can be determined based on whether a single media file is to be played or a series of media files (a playlist) is to be played. For example, a short video clip could be sent to help find the playlist. Playlists for Adobe Flash plug-ins are embedded in the content of the plug-in code, so native plug-in 606 would likely request multiple video files and create a playlist. To get through this playlist quickly, even though a video is requested by the plug-in, a short video clip can be sent to trick native plug-in 606 so it can request the second, third, etc. video clips quickly.

In the scenario where a single media file is discovered, media discovery plug-in 604 can issue (712) a command to browser proxy 602 to insert an image and/or a link, along with an assigned token, into the content that the end user can click on to view the video. On the other hand, for the scenario where a series of media files are discovered, e.g. where native plug-in requests one or more additional media files from the additional content media discovery plug-in 604 can remember the URL along with the previous URLs and a generate a playlist. If no further request is issued by native plug-in 606, then browser proxy 602 can stop media discovery plug-in 604, which in turn stops native plug-in 606. Then browser proxy 602 can send (713) the resulting content back to user agent 102.

Figure 8:
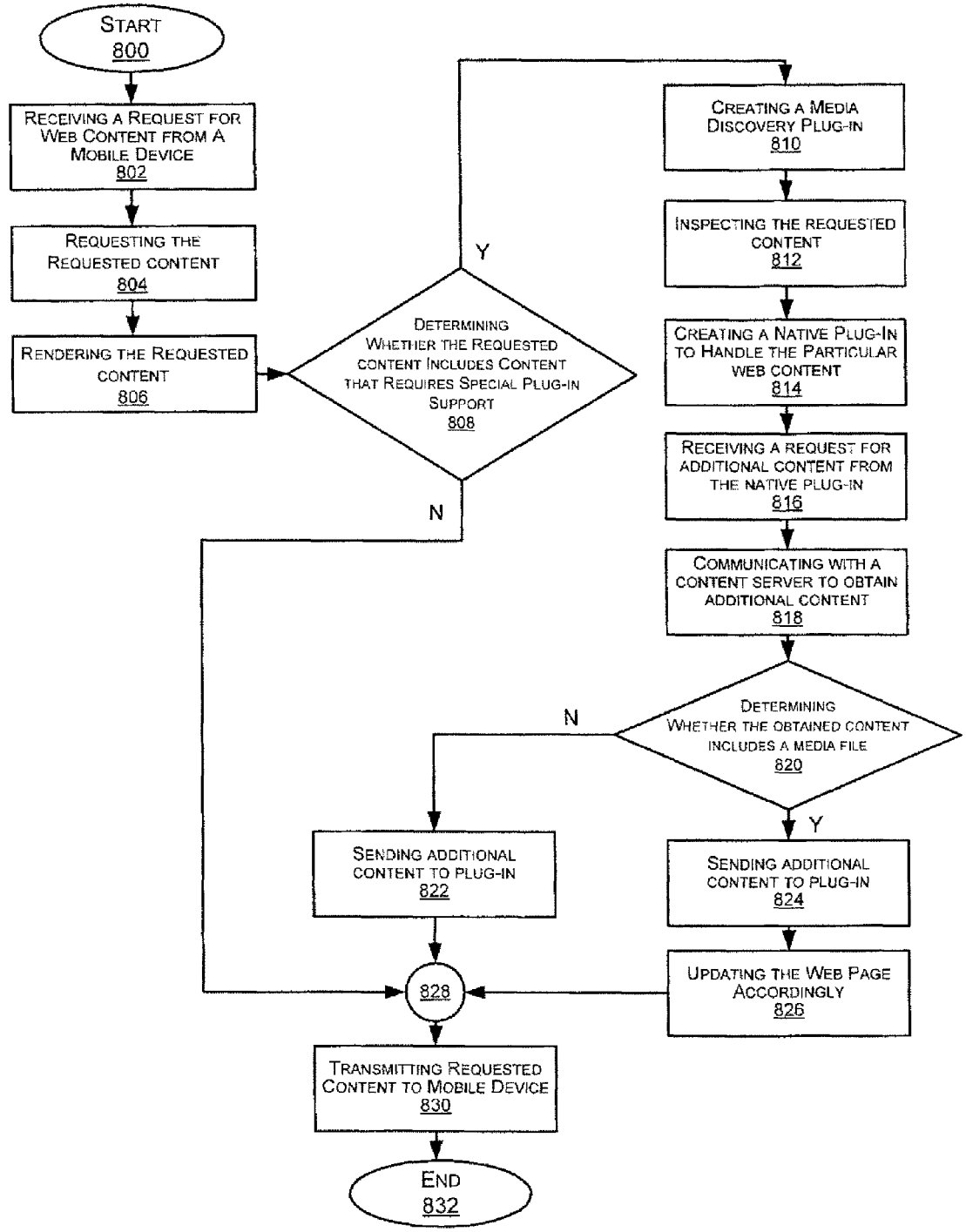
FIG. 8 is a flowchart representing an exemplary method for implementing plug-in-based media discovery.

FIG. 8 is a flowchart representing an exemplary method for implementing plug-in-based media discovery. Referring to FIG. 8, it will be readily appreciated by one of ordinary skill in the art that the illustrated procedure can be altered to delete steps or further include additional steps. After initial start step 800, a proxy server (e.g., proxy 110 and/or browser proxy 202) receives (802) a request for web content (e.g., webpage) from a mobile device. In some embodiments, the proxy server may actually intercept a communication between the mobile device and a content server having the content of the request. After receiving the request, the proxy server requests (804) the requested content from the content server. Upon receiving the requested content, the proxy server examines (806) the content. In some embodiments, the proxy server can examine the content by rendering the content. Upon examining the content, the proxy server can determine (808) whether the requested content includes content that requires special plug-in support. If not, the method proceeds to connector 828.

On the other hand, if the requested content does include content requiring special plug-in support, the proxy server can create (810) a media discovery plug-in by providing the requested content to the media discovery plug-in. After receiving the requested content, the media discovery plug-in further inspects (812) the particular content for a special plug-in support. Upon locating this content requiring special plug-in support, the media discovery plug-in creates (814) a native plug-in to handle the particular content by providing at least a portion of the requested content to the native plug-in. In some embodiments, the creation of the native plug-in 606 is not needed and the media discovery plug-in 604 is used to implement the media discovery. At some point thereafter, the media discovery plug-in and/or proxy server may receive (816) a request for media content from the native plug-in. The proxy server and/or the media discovery plug-in then communicates (818) with a content server to obtain additional content. After receiving the additional content, the media discovery plug-in determines (820) whether the obtained content includes one or more media files. If not, the media discovery plug-in simply provides (822) the requested media content to native plug-in.

If the obtained content does include one or more media files, the media discovery plug-in sends (824) additional content to the native plug-in for processing. Further, the proxy server and/or the media discovery plug-in updates (826) the content by including a picture and/or a link in the place of the media files. The picture/link would allow a user at a user agent of the mobile device the ability to click on the picture/link for accessing the media files. Further, because the media files are not initially included with the requested content to be transmitted to the user agent, the time for downloading the content can be significantly reduced.

After updating the content, the method proceeds through connector 828 and the proxy server transmits (830) the requested content to the mobile device. After the transmittal, the method can end 832.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A method executed by one or more servers that are remote from a mobile device and a content server, the method comprising:
   receiving from the mobile device a first request for a web page;
   forwarding the request to the content server and receiving web content associated with the requested web page;
   rendering the web page using the received web content;
   determining whether the received content includes particular content requiring plug-in support, based on the rendering;
   initiating a plug-in to handle the particular content, based on the determination;
   providing the particular content to the plug-in;
   acquiring additional content based on an examination of the particular content;
   monitoring the additional content to determine whether the additional content includes media content;
   determining whether the media content includes a series of media files;
   generating a playlist based on the determination that media content includes a series of media files, wherein a media clip is sent to the plug-in for each media file in the series of media files and the media clips are shorter than the media files; and
   updating the received content for the requested web page with the playlist, wherein the updated content is to be provided to the mobile device.

2. The method of claim 1, wherein initiating a plug-in involves initiating a native plug-in to handle the particular content.

3. The method of claim 2, wherein acquiring additional content includes receiving a second request for additional content from the native plug-in and retrieving the additional content for the native plug-in.

4. The method of claim 1, wherein initiating the plug-in involves initiating a media discovery plug-in when the content includes particular content requiring plug-in support, wherein the media discovery plug-in performs the monitoring.

5. The method of claim 4, further comprising initiating a native plug-in by a media discovery plug-in when the content includes particular content requiring plug-in support.

6. The method of claim 5, wherein obtaining additional content includes receiving a second request for additional content from the native plug-in and retrieving the additional content for the native plug-in.

7. A method executed by one or more servers that are remote from a mobile device and a content server, the method comprising:

receiving from the content server content requiring plug-in support, wherein the received content corresponds to a request from the mobile device for a web page;
rendering the web page using the received content;
determining whether the received content includes particular content requiring plug-in support, based on the rendering;
initiating a native plug-in, which is registered to handle the particular content requiring the support, based on the determination;
providing the particular content to the native plug-in;
receiving a request for additional content from the native plug-in;
retrieving the additional content for the native plug-in;
monitoring the additional content to determine whether the additional content includes media content;
determining whether the media content includes a series of media files;
generating a playlist based on the determination that media content includes a series of media files, wherein a media clip is sent to the plug-in for each media file in the series of media files and the media clips are shorter than the media files; and
providing a notification to a proxy server, wherein the notification informs the proxy server that the additional content includes the generated playlist, wherein the generated playlist can be processed before being provided to the mobile device.

8. A system comprising:
a user agent transmitting a first request for a web page;
a proxy server configured to
  receive from the user agent the first request for the web page,
  forward the request to the content server and receive web content associated with the requested web page,
  render the web page using the received content,
  determine whether the content includes particular content requiring plug-in support based on the rendering,
  initiate a plug-in to handle the particular content, based on the determination,
  provide the particular content to the plug-in,
  acquire additional content based on an examination of the particular content,
  monitor the additional content to determine whether the additional content includes media content,
  determine whether the media content includes a series of media files,
  generate a playlist based on the determination that media content includes a series of media files, wherein a media clip is sent to the plug-in for each media file in the series of media files and the media clips are shorter than the media files, and
  update the received content for the requested web page with the generated playlist, wherein the updated content is to be provided to the user agent.

9. The system of claim 8, wherein the plug-in is a media discovery plug-in configured to be initiated when the content includes the particular content requiring plug-in support.

10. The system of claim 9, wherein the media discovery plug-in initiates a native plug-in and monitors the additional content.

11. The system of claim 10, wherein the media discovery plug-in obtains additional content by receiving a second request for additional content from the native plug-in and retrieving the additional content for the native plug-in.

12. The system of claim 8, wherein the plug-in is a native plug-in configured to be initiated when the content includes the particular content requiring plug-in support.

13. The system of claim 12, wherein the proxy server receives a second request for additional content from the native plug-in and retrieves the additional content for the native plug-in.

14. A non-transitory computer-readable storage medium storing instructions that, when executed by one or more servers that are remote from a mobile device and a content server, cause the one or more servers to perform a method of media discovery, the method comprising:
receiving from the mobile device a first request for a web page;
forwarding the request to the content server and receiving web content associated with the requested web page;
rendering the web page using the received web content;
determining whether the received content includes particular content requiring plug-in support, based on the rendering;
initiating a plug-in to handle the particular content, based on the determination;
providing the particular content to the plug-in;
acquiring additional content based on an examination of the particular content;
monitoring the additional content to determine whether the additional content includes media content;
determining whether the media content includes a series of media files;
generating a playlist based on the determination that media content includes a series of media files, wherein a media clip is sent to the plug-in for each media file in the series of media files and the media clips are shorter than the media files; and
updating the received content for the requested web page with the playlist, wherein the updated content is to be provided to the mobile device.

15. A non-transitory computer-readable storage medium storing instructions that, when executed by one or more servers that are remote from a mobile device and a content server, cause the one or more servers to perform a method of media discovery,
receiving from the content server content requiring plug-in support, wherein the received content corresponds to a request from the mobile device for a web page;
rendering the web page using the received content;
determining whether the received content includes particular content requiring plug-in support, based on the rendering;
initiating a native plug-in, which is registered to handle the particular content requiring the support, based on the determination;
providing the particular content to the native plug-in;
receiving a request for additional content from the native plug-in;
retrieving the additional content for the native plug-in;
monitoring the additional content to determine whether the additional content includes media content;
determining whether the media content includes a series of media files;
generating a playlist based on the determination that media content includes a series of media files, wherein a media clip is sent to the plug-in for each media file in the series of media files and the media clips are shorter than the media files; and
providing a notification to a proxy server, wherein the notification informs the proxy server that the additional content includes the generated playlist, wherein the generated playlist can be processed before being provided to the mobile device.

* * * * *